United States Patent
Kuchenbrod et al.

(10) Patent No.: US 10,452,885 B1
(45) Date of Patent: Oct. 22, 2019

(54) OPTIMIZED BARCODE DECODING IN MULTI-IMAGER BARCODE READERS AND IMAGING ENGINES

(71) Applicant: Zebra Technologies Corporation, Lincolnshire, IL (US)

(72) Inventors: Harry E. Kuchenbrod, Kings Park, NY (US); David P. Goren, Smithtown, NY (US); Chinh Tan, East Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 15/955,255

(22) Filed: Apr. 17, 2018

(51) Int. Cl.
*G06K 7/10* (2006.01)
*G06K 7/14* (2006.01)

(52) U.S. Cl.
CPC ......... *G06K 7/1443* (2013.01); *G06K 7/1413* (2013.01); *G06K 2007/10524* (2013.01)

(58) Field of Classification Search
USPC ............ 235/462.45, 462.14, 462.25, 462.22, 235/462.454, 462.455, 454, 455, 462.01
See application file for complete search history.

(56) References Cited

U.S. PATENT DOCUMENTS

| | | | | |
|---|---|---|---|---|
| 5,949,054 | A * | 9/1999 | Karpen | G06K 7/10851 235/462.01 |
| 9,185,306 | B1 * | 11/2015 | Tan | G06K 7/10801 |
| 9,286,502 | B1 * | 3/2016 | Ashby | G06K 7/1465 |
| 2002/0039137 | A1 * | 4/2002 | Harper | G06K 7/10722 348/207.99 |
| 2004/0118922 | A1 * | 6/2004 | Murata | G06K 7/10722 235/454 |
| 2005/0117813 | A1 * | 6/2005 | Nishida | G06F 3/14 382/275 |
| 2006/0027661 | A1 * | 2/2006 | Hosoi | G06K 7/10851 235/462.25 |
| 2006/0285587 | A1 * | 12/2006 | Luo | G06T 5/009 375/240.2 |
| 2007/0295814 | A1 * | 12/2007 | Tanaka | G06K 7/10722 235/454 |
| 2009/0084847 | A1 * | 4/2009 | He | G06K 7/10722 235/455 |
| 2015/0085179 | A1 * | 3/2015 | Van Heugten | H04N 5/23212 348/349 |
| 2017/0289451 | A1 * | 10/2017 | Wittenberg | H04N 5/2258 |

* cited by examiner

*Primary Examiner* — Tuyen K Vo
(74) *Attorney, Agent, or Firm* — Yuri Astvatsaturov

(57) ABSTRACT

In an embodiment, the present invention is a barcode reader that includes: a first imaging assembly configured to capture a first image; a second imaging assembly positioned relative to the first imaging assembly and configured to capture a second image; and a controller communicatively coupled to the first imaging assembly and the second imaging assembly. The controller is configured to: calculate a first contrast level within a first region within the first image; calculate a second contrast level within a second region within the second image; execute a first barcode-decode operation on the first image when the first contrast level is greater than the second contrast level; and execute the first barcode-decode operation on the second image when the second contrast level is greater than the first contrast level.

20 Claims, 7 Drawing Sheets

OPTIMIZED BARCODE DECODING IN MULTI-IMAGER BARCODE READERS AND IMAGING ENGINES

BACKGROUND

It is common to find barcode readers in use in a variety of venues like retail environments, warehouses, product transport facilities, factories, and so on. In many cases, these barcode readers are expected to operate over a wide range of distances, giving the operator the ability to read barcodes from just inches away to tens of feet. While it is possible to construct such readers using a single imaging assembly, this design is not cost effective as it requires complex optical componentry that is operable to capture image data over the wide working range. Instead, a more common approach relies on multiple (often two) imaging assemblies where each assembly is configured to capture image data over a subset of the entire working range. This method is advantageous as it employs simpler optical components that can be both more robust and cost efficient. However, there are also drawbacks. For example, due to the use of multiple imaging assemblies, the barcode reader may be tasked with attempting to decode a barcode within multiple respective images. This can increase computational resources allocated to image analysis, delay the overall scan operation, and/or increase power consumption resulting in faster battery drain in cases of cordless readers. As such, there is a need to optimize decode operations in barcode readers having multiple imaging assemblies.

SUMMARY

Accordingly, at least some embodiments of the present invention are directed towards devices, systems, and methods of optimizing decode operations in barcode readers having multiple imaging assemblies.

In an embodiment, the present invention is a barcode reader that includes: a first imaging assembly configured to capture a first image over a first field of view (FOV); a second imaging assembly positioned relative to the first imaging assembly and configured to capture a second image over a second FOV; and a controller communicatively coupled to the first imaging assembly and the second imaging assembly. The controller is configured to: calculate a first contrast level within a first region, the first region being within the first image; calculate a second contrast level within a second region, the second region being within the second image; execute a first barcode-decode operation on the first image when the first contrast level is greater than the second contrast level; and execute the first barcode-decode operation on the second image when the second contrast level is greater than the first contrast level.

In another embodiment, the present invention is an imaging engine for use in a barcode reader. The imaging engine includes: a first imaging assembly configured to capture a first image over a first FOV; a second imaging assembly positioned relative to the first imaging assembly and configured to capture a second image over a second FOV; and a controller communicatively coupled to the first imaging assembly and the second imaging assembly. The controller is configured to: calculate a first contrast level within a first region, the first region being within the first image; calculate a second contrast level within a second region, the second region being within the second image; execute a first barcode-decode operation on the first image when the first contrast level is greater than the second contrast level; and execute the first barcode-decode operation on the second image when the second contrast level is greater than the first contrast level.

In still another embodiment, the present invention is a method of decoding a barcode with a barcode reader having a controller communicatively coupled to a first imaging assembly and a second imaging assembly, the method including: capturing a first image via the first imaging assembly over a first FOV; capturing a second image via the second imaging assembly over a second FOV; calculating, via the controller, a first contrast level within a first region, the first region being within the first image; calculate, via the controller, a second contrast level within a second region, the second region being within the second image; executing a first barcode-decode operation on the first image when the first contrast level is greater than the second contrast level; and executing the first barcode-decode operation on the second image when the second contrast level is greater than the first contrast level.

These and other features, aspects, and advantages of the present disclosure will become better-understood with reference to the following drawings, description, and any claims that may follow.

DRAWINGS

DETAILED DESCRIPTION

Figure 1:
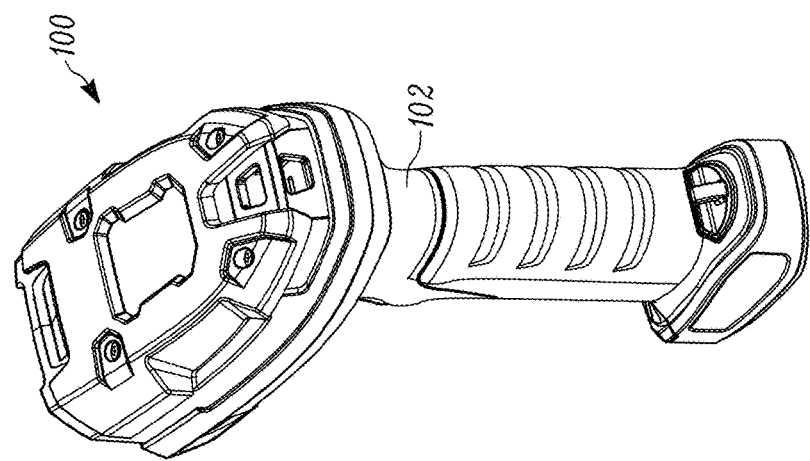
FIG. 1 illustrates front and rear perspective views of a barcode reader, in accordance with an embodiment of the present invention.
Figure 1:
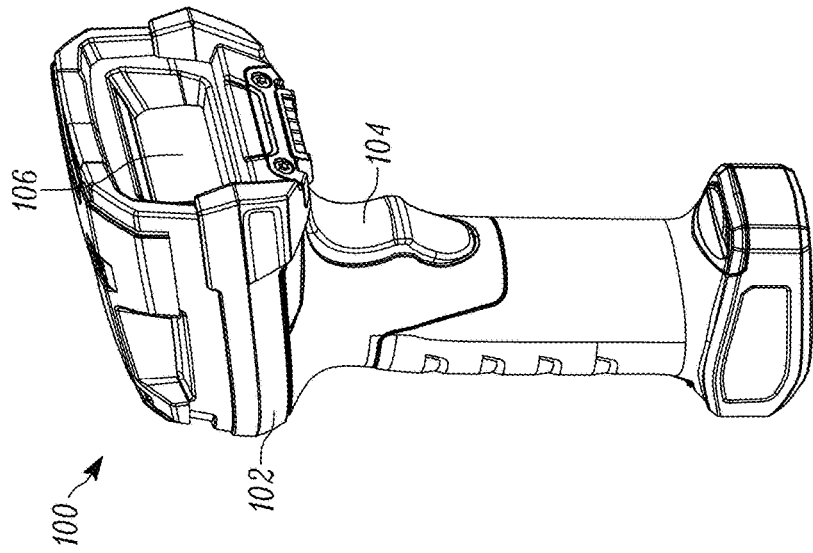

Referring to FIG. 1, shown therein is an exemplary barcode reader 100 having a housing 102 with a cavity for housing internal components, a trigger 104, and a window 106. The barcode reader 100 can be used in a hands-free mode as a stationary workstation when it is placed on the countertop in a supporting cradle (not shown). The barcode reader 100 can also be used in a handheld mode when it is picked up off the countertop (or any other surface) and held in an operator's hand. In the hands-free mode, products can be slid, swiped past, or presented to the window 106. In the handheld mode, the barcode reader 100 can be aimed at a barcode on a product, and the trigger 104 can be manually depressed to initiate imaging of the barcode. In some implementations, the supporting cradle can be omitted, and the housing 102 can also be in other handheld or non-handheld shapes.

Figure 2:
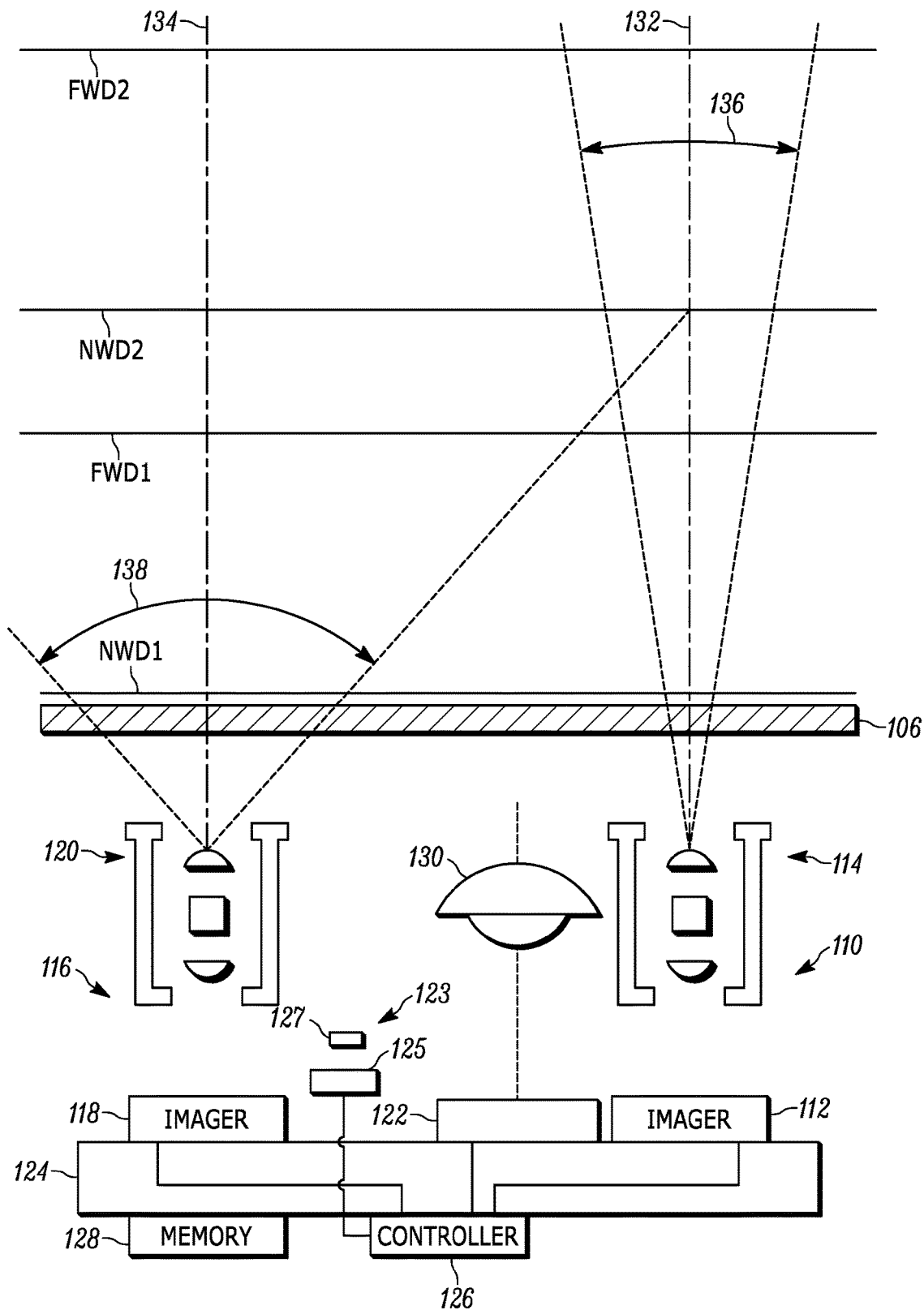
FIG. 2 illustrates a block schematic diagram of a portion of a barcode reader, in accordance with an embodiment of the present invention.

FIG. 2 illustrates a block schematic diagram of a portion of a barcode reader 100 in accordance with some embodiments. It should be understood that FIG. 2 is not drawn to scale. The barcode reader 100 in FIG. 2 includes the following components: (1) a first imaging assembly 110 that includes a first linear imaging sensor 112 and a first lens assembly 114; (2) a second imaging assembly 116 that includes a second linear imaging sensor 118 and a second lens assembly 120; (3) an illumination source 122; (4) an aiming light assembly 123 having an aiming light source 125 and an aiming lens assembly 127 (also referred to as an aiming beam shaper); (5) a printed circuit board (PCB) 124 supporting the first and second linear imaging sensors 112, 118, and the illumination source 122; (6) a controller 126 positioned on the PCB 124 and communicatively coupled to the first and second linear imaging sensors 112, 118, and the illumination source 122; (7) a memory 128 connected to the controller 126; and (8) an illumination lens assembly 130 positioned in front of the illumination source 122. In referring to portions of the barcode reader, may be grouped and referred to as an "imaging engine." In some instances, the imaging engine can be said to include image capture components like the image sensor(s). In other instances, the imaging engine can be said to include additional elements such as, for example, an aiming light assembly. In still other instances, an imaging engine can be said to include image capture components like the image sensor(s) along with the controller that they are coupled to. Additionally, it should be appreciated that references to a controller can include multiple integrated circuits functioning together to control various reader components and/or analyze/perform various calculations and/or step. These functions can be carried out by programming the controller with certain instructions provided in the form of computer code and/or by configuring certain action to be performed by way of hardware response to an input signal.

The first and second linear imaging sensors 112, 118 can be either CCD or CMOS linear imaging sensors that generally include multiple photosensitive pixel elements aligned in one-dimensional array. The first and second linear imaging sensors 112, 118 are operative to detect light captured, respectively, by the first and second lens assemblies 114, 120 along a respective optical path or axis 132, 134 through the window 106. Generally, each respective linear imaging sensor and imaging lens assembly pair is designed to operate together for capturing light scattered, reflected, or emitted from a barcode as pixel data over a one-dimensional field of view (FOV) extending along a respective linear FOV plane. However, each lens/imaging sensor pair (also referred to as an optical assembly) is configured with different parameters.

In the currently described embodiment, the first imaging assembly 110 is designed to read barcodes over a relatively far working distance range that extends between FWD1 and FWD2. In some embodiments, FWD1 is approximately 24 inches from the window 106 and FWD2 is approximately 600 to 680 inches from the window 106. In some embodiments, FWD2 extends beyond 680 inches. Additionally, imaging assembly 110 captures light from a relatively narrow FOV 136. On the other hand, the second optical assembly 116 is designed to read barcodes over a relatively near working distance range that extends between NWD1 and NWD2. In some embodiments, NWD1 is approximately 0 inches from the window 106 and NWD2 is approximately 28 to 32 inches from the window 106. Additionally, imaging assembly 116 captures light from a relatively wider FOV 138.

Figure 3A:
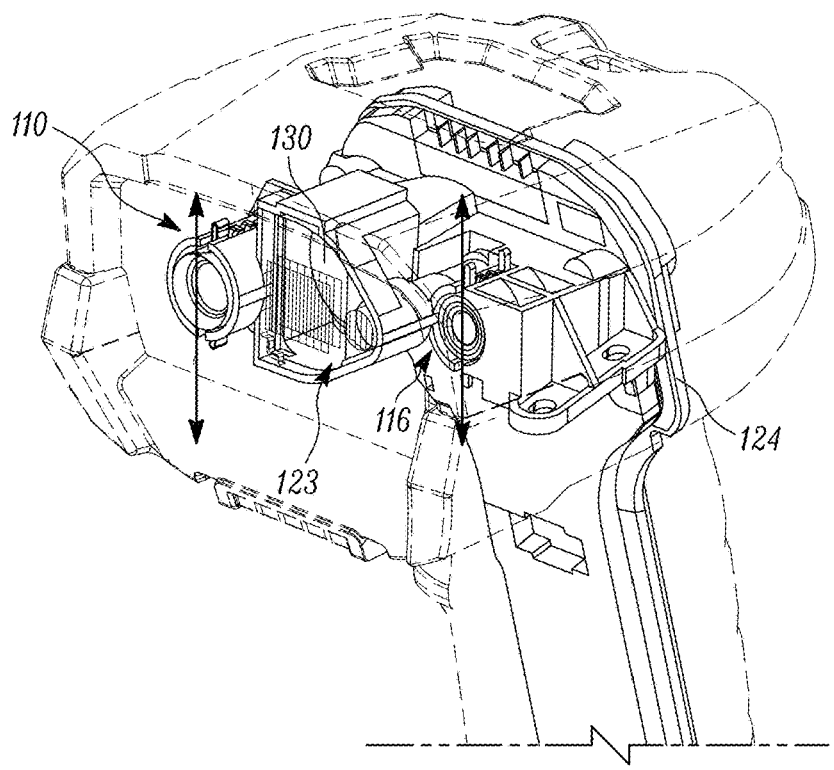
FIG. 3A illustrates a perspective view of some components a barcode reader, in accordance with an embodiment of the present invention.
Figure 3B:
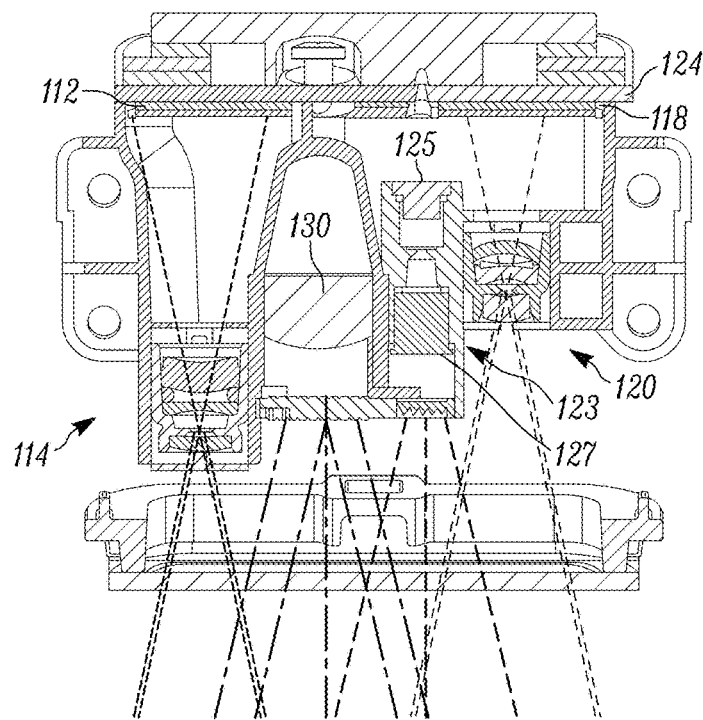
FIG. 3B illustrates a top cut-away view of the components of FIG. 3A.

An example of the component arrangement of FIG. 2 is illustratively shown in a perspective view of FIG. 3A and the top cut-away view of FIG. 3B which show some components of the reader 100 in a partially assembled form. In this embodiment, the aiming assembly is positioned between the first imaging assembly and the second imaging assembly. In a preferred configuration, the aiming assembly is positioned closer to the second (near) imaging assembly than the first imaging (far) assembly. This can be advantageous as the shift of the aiming light pattern relative to the FOV of the second (near) imaging assembly due to parallax is reduced. Additionally, in the embodiment shown in FIGS. 3A and 3B, the first linear imaging sensor 112 and the second linear imaging sensor 118 are positioned on a substrate (such as a PCB 124) such that a distance between the first linear imaging sensor 112 and the first lens assembly 114 is different from a distance between the second linear imaging sensor 118 and the second lens assembly 120. Furthermore, the imaging assemblies and the aiming assembly can be situated such that their respective fields of view (which are shown as being coplanar in FIGS. 4 and 5) and the respective planes along which they extend form an oblique angle relative to a PCB plane that is defined by the lengthwise and widthwise directions of the PCB 124.

To optimize the operation of the barcode reader 100, pre-processing of image data captured by each imaging assembly may be conducted prior to executing decode operations. Preferably, the pre-processing operation executes in less time than a full decode operation and provides an indication on which image should be used (at least initially) in the full decode operation. An example of such pre-processing operations can be implemented with the assistance of respective image contrast levels, as further described below.

Figure 4A:
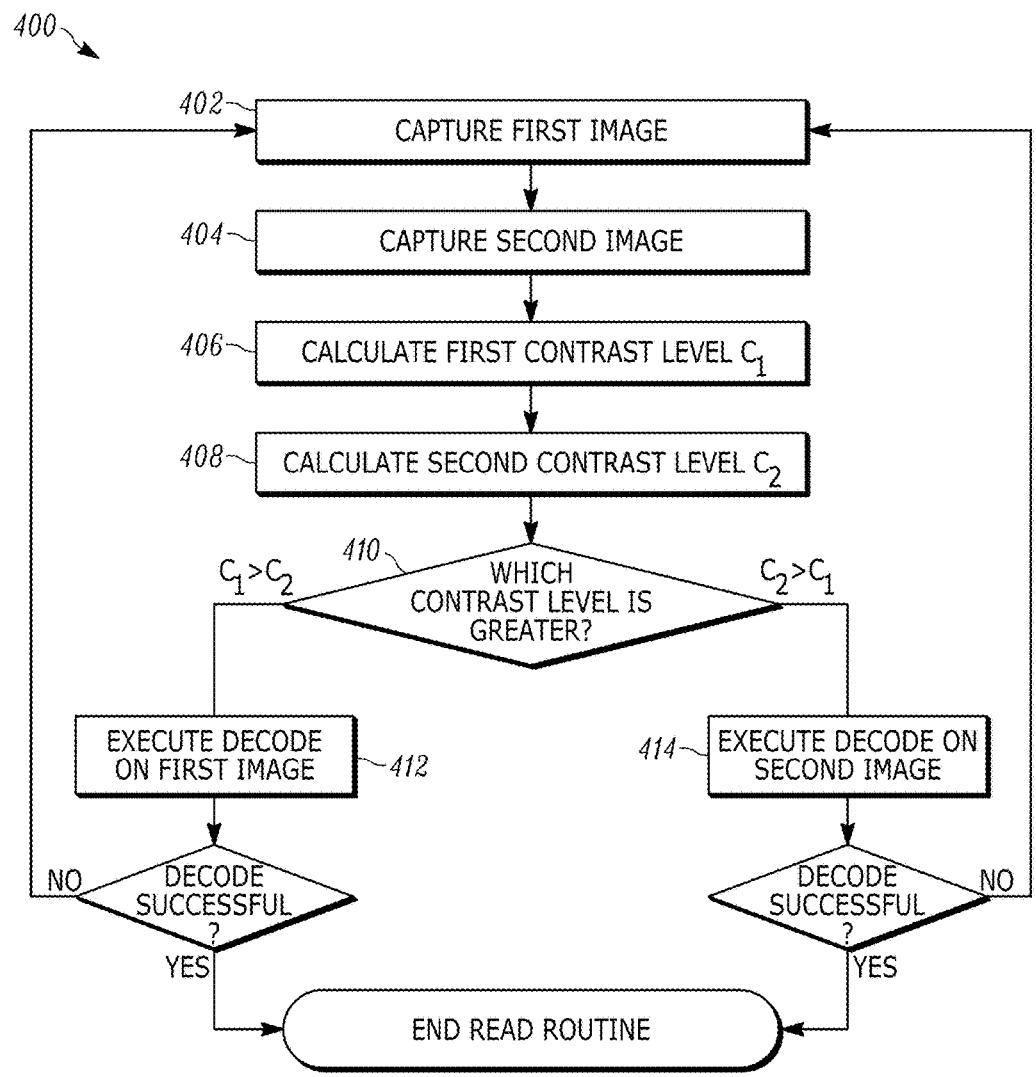
FIG. 4A is a flowchart representative of an exemplary method of decoding a barcode with a barcode reader, in accordance with an embodiment of the present invention.
Figure 4B:
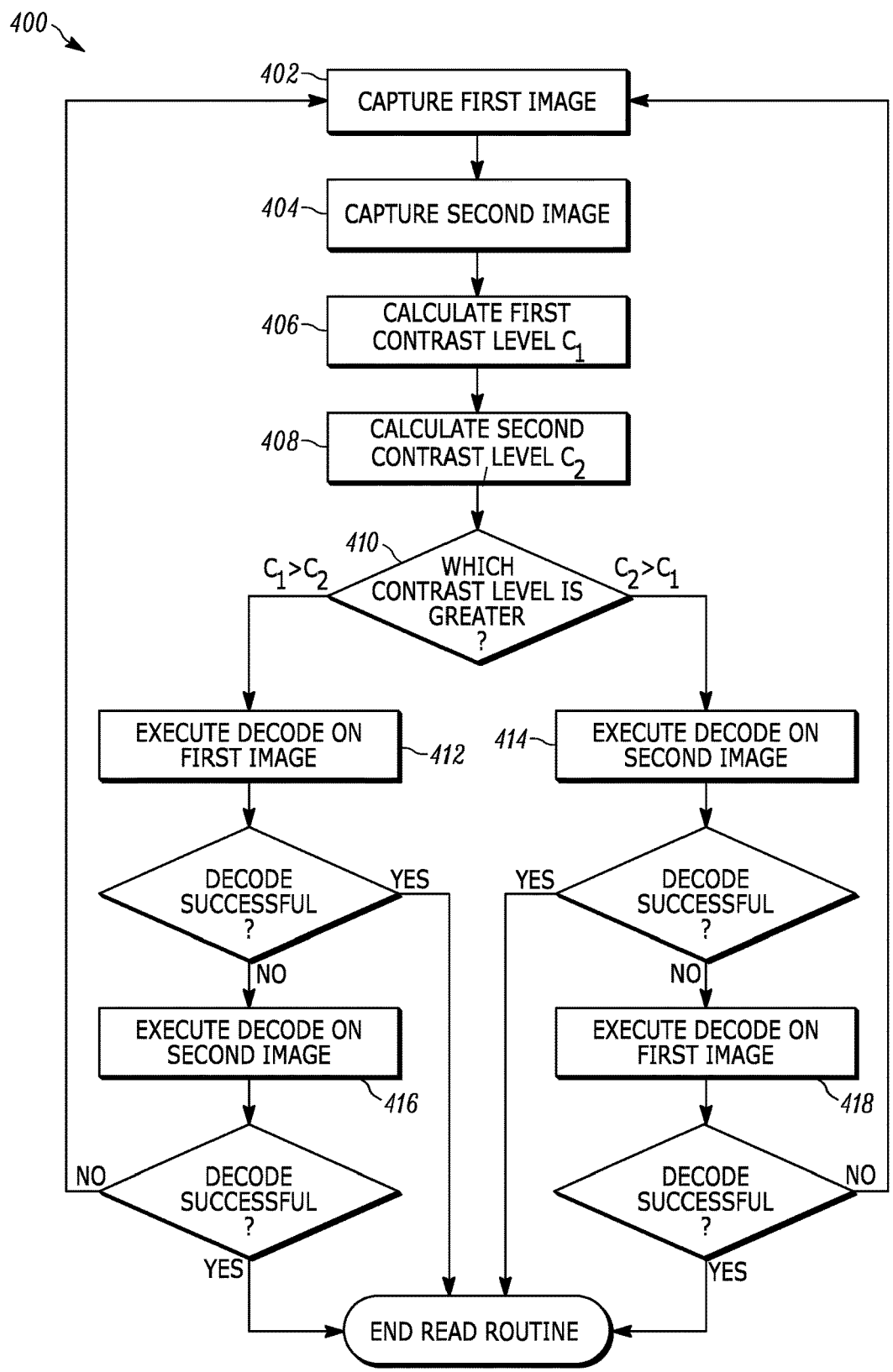
FIG. 4B is a flowchart representative of an exemplary method of decoding a barcode with a barcode reader, in accordance with an embodiment of the present invention.
Figure 5A:
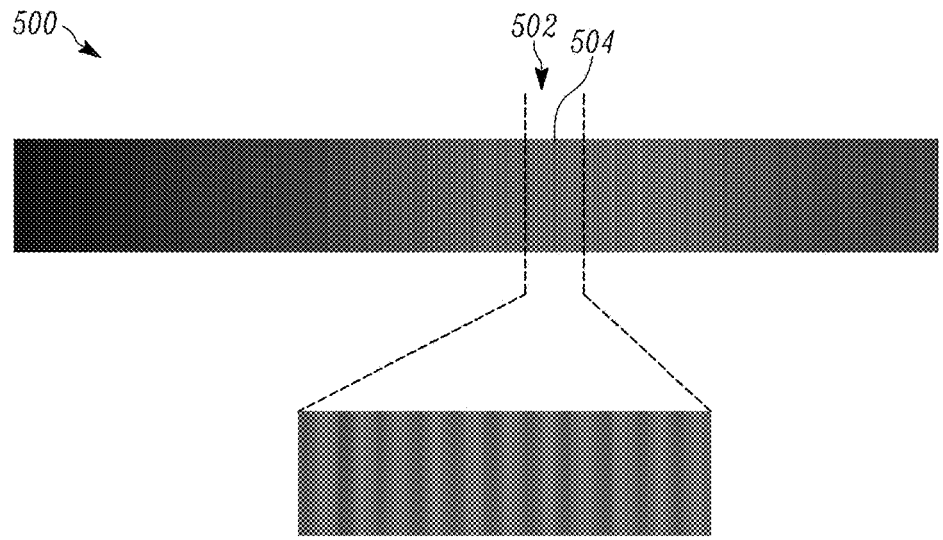
FIG. 5A illustrates an exemplary image captured by an imaging assembly.
Figure 6A:
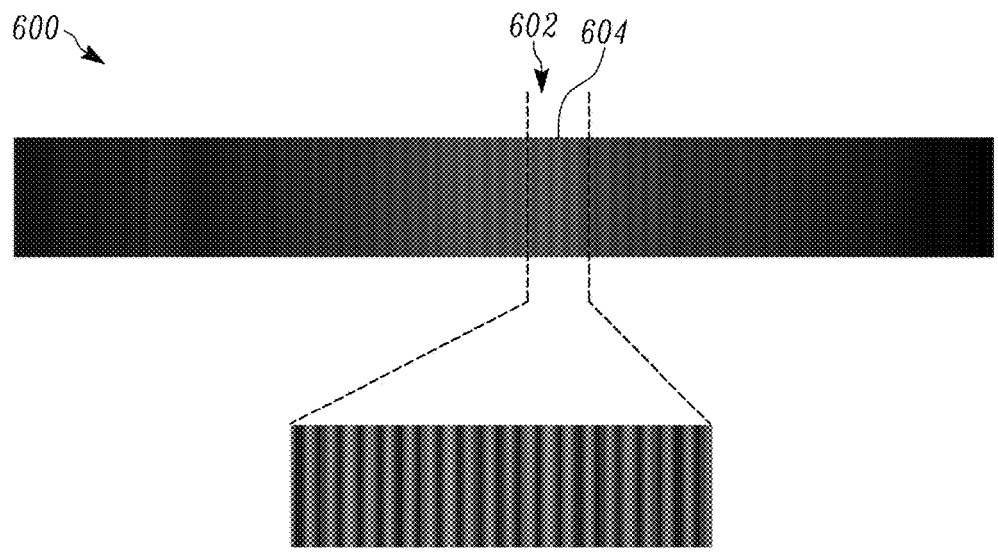
FIG. 6A illustrates an exemplary image captured by an imaging assembly.

Referring to FIG. 4A, shown therein is a flowchart representative of an exemplary method 400 of decoding a barcode with a barcode reader. The barcode reader may be reader 100 that includes a controller 126 communicatively coupled to a first imaging assembly 110 and a second imaging assembly 116. The method includes steps 402 and 404 where the reader, by way of the respective first and second imaging assemblies, captures respective first and second images of an environment. When used with the reader 100 having a configuration shown in FIG. 2, the first image is captured by the first imaging assembly 110 over a first field of view (FOV) 136 and the second image is captured by the second imaging assembly 116 over a second FOV 138. Preferably, but not necessarily, the images are captured simultaneously. Since both fields of view 136, 138 generally point in the same direction, at least some portion of a target (usually comprising a barcode that is desired to be read) will appear within both of those fields of view. However, since one FOV (e.g., FOV 136) may be configured to capture image data over a more distant working range than the other FOV (e.g., FOV 138), one of the captured images will likely be more in-focus than the other image. Additionally, due to the use of different optics in the imaging assemblies, the actual composition of the respective images will vary. An example of a first image captured by the first imaging assembly 110 of a target positioned some predetermined distance away from the reader 100 is shown in FIG. 5A and an example of a second image captured by the second imaging assembly 116 of the same target positioned at the same predetermined distance away from the reader 100 is shown in FIG. 6A. Those of ordinary skill will appreciate that since the imaging assemblies 110, 116 are exemplarily described as including linear imagers, originally captured first and second images 500, 600 have a height of one pixel. However, for purposes of illustration, the height of these pixel (and thus the images overall) has been increased, creating some distortion in the images' aspect ratio. In other words, the images have been stretched in the vertical direction.

Upon capturing the images 500, 600 in steps 402, 404, the images are pre-processed by the controller to determine which of the images should be used (at least at first) to conduct a decode operation. As shown in step 406, this includes the operation of calculating a first contrast level within a first region of the first image. While it may be possible to use the entire first image 500 as the first region to conduct necessary calculations, in a preferred embodiment, the first region is a subset of the first image 500. Limiting the first region to some portion of the overall image 500 may allow for a reduced computational burden on the controller and the supporting componentry, potentially increasing processing times and lowering power consumption. Additionally, concentration on a targeted region of an image may result in more consistent and better results as areas that are likely to be outside the intended target may be disregarded during image analysis. As such, the first region may be selected as a subset (i.e., a portion) of the first image according to any criteria that is found to be applicable and/or desirable. For example, the first region may be comprised of a predetermined percentage (e.g., 5%, 15%, 20%, 25%, 30%, 33%, 35%, 40%, or any other suitable percentage) of the first image where the first region is centered, for example, about the center of first image. Thus, applying this example to a linear image, like the image 500, that is 2500 pixels wide, a range equivalent to a portion covering 20% of the overall image and centered about the image's center would cover pixels 1001-1500 when the pixels are consecutively numbered 1 to 2500. In other words, the range would cover the central 500 pixels. Moreover, the specific portion of the image covered by the region of interest can be determined by any number of underlying factors that may, but do not have to, themselves require some additional analysis. For instance, a region of interest may be centered not about the center of an image, but instead about a calibrated point that is intended to indicate a zero-parallax point at a certain working distance. Accordingly, a region of an image can ultimately be any set or subset of pixels of that image, where the set/subset is dictated by some underlying factors. The same concept could further be applied to a two-dimensional sensor where the desired region is formed of any applicable/desirable part of the overall image.

Figure 5B:
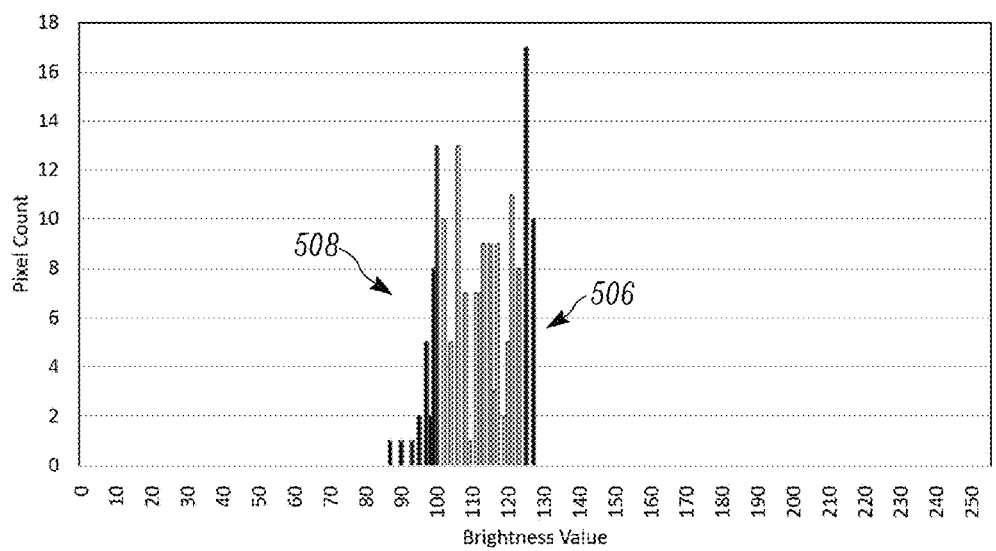
FIG. 5B illustrates a histogram of the image of FIG. 5A.

In the currently described embodiment, the first region 502 is selected as a set of 166 consecutive horizontal pixels centered about a predetermined, zero-parallax point (pixel) 504. In some embodiments, the contrast level can be calculated within this region by determining a white level and a black level, and associating the contrast level with a difference between the white level and the black level. The white level can be defined as a lowest brightness value of a subset of brightest pixels of a respective region and a black level can be defined as a highest brightness value of a subset of darkest pixels of the respective region. One way to obtain these values is by deriving and analyzing a histogram of the region of interest. FIG. 5B illustrates a histogram of the exemplary region 502 plotting the pixel count within the region against an 8-bit brightness scale ranging from 0 to 255. To calculate the white level from this histogram, the subset of brightest pixels of the region can be set to a predetermined value such as, for example, 5%, 10%, 12%, 12.5%, 13%, 15%, 20%, etc. of the total amount of pixels in the region. Assuming, for the purposes of this example, that the subset of brightest pixels of the region 502 is 12.5% of said region, that would mean that said subset is comprised of 21 brightest pixels 506 (12.5% of 166 pixels of the region 502 rounded up to a complete pixel count) in that region, denoted in solid black color in FIG. 5B. Combining that with the histogram data, it is possible to obtain the lowest brightness value within the 21 brightest pixels 506. Another way to view it would be, starting from the right of the graph (brightness value 255) and moving to the left, add the pixel count until 21 pixels are reached. The brightness value where 21 pixels are reached signifies the lowest brightness value within the 21 brightest pixels, and therefore the white level for the region 502. In FIG. 5B, the white level is illustrated as having a brightness value of 125.

Similar to the white level, the black level can also be derived from the histogram. However, rather than evaluating a subset of the brightest pixels, black level calculation focuses on the highest brightness value of a subset of darkest pixels of the respective region. As with the subset of brightest pixels, the subset of darkest pixels of the region can be set to a predetermined value such as, for example, 5%, 10%, 12%, 12.5%, 13%, 15%, 20%, etc. of the total amount of pixels in the region. Additionally, the size of the subset of darkest pixels may, but does not have to, be equal to the size of the subset of brightest pixels. Assuming, for the purposes of this example, that the subset of darkest pixels of the region 502 is 12.5% of said region, that would mean that said subset is comprised of 21 darkest pixels 508 (12.5% of 166 pixels of the region 502 rounded up to a complete pixel count) in that region, denoted in solid black color in FIG. 5B. Combining that with the histogram data, it is possible to obtain the highest brightness value within the 21 darkest pixels 508. Another way to view it would be, starting from the left of the graph (brightness value 0) and moving to the right, add the pixel count until 21 pixels are reached. The brightness value where 21 pixels are reached signifies the highest brightness value within the 21 darkest pixels, and therefore the black level for the region 502. In FIG. 5B, the black level is illustrated as having a brightness value of 100. Once the white and the black levels are determined, the contrast level for the region 502 can be calculated by finding the difference between the while level and the black level. In case of the region 502, the contrast level is 25 (=125 [white level]−100 [black level]).

Figure 6B:
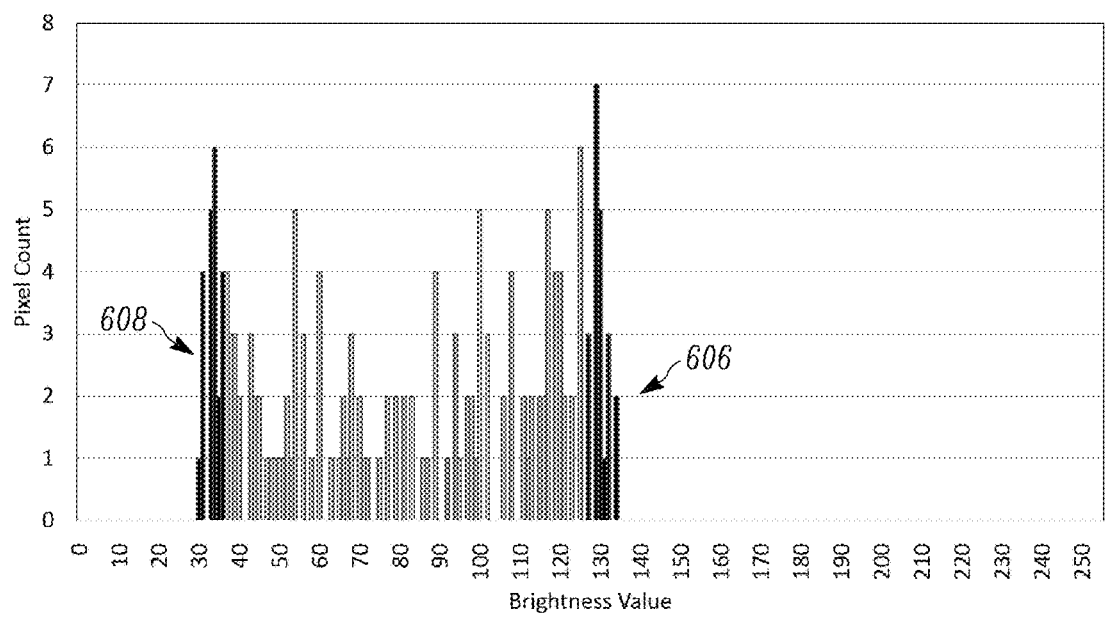
FIG. 6B illustrates a histogram of the image of FIG. 6A.

Similar to calculating the first contrast level, a second contrast level is computed for a region in the second image 600 in step 408. It will be appreciated that region selection, white level calculation, and black level calculation techniques described above with respect to the first image 500 are equally applicable to the second image 600. As such, those of ordinary skill will appreciate that there is no need to restate them verbatim as they apply to the second image 600. Taking the foregoing into consideration, the second region 602 is selected as a set of 166 consecutive pixels centered about a predetermined, zero-parallax point (pixel) 604. To determine the contrast of this region, the white and black levels are first calculated from the histogram shown in FIG. 6B. For the purposes of this embodiment, the white level is associated with the lowest brightness value of a subset 606 of brightest pixels of the region 604, where the subset is equivalent to 12.5% of the total amount of pixels in the region. Similarly, for the purposes of this embodiment, the black level is associated with the highest brightness value of a subset 608 of darkest pixels of the region 604, where the subset is equivalent to 12.5% of the total amount of pixels in the region. Based on the histogram of FIG. 6B, one can determine that the white level has a value of 127 and the black level has a value of 36. From that, the contrast level for the region 604 is 91 (=127 [white level]−36 [black level]).

Once the first and second contrast levels have been obtained, a comparison 410 of one contrast level versus the other contrast level can be made to help determine whether the first image 500 or second image 600 should be the subject of a barcode decode operation. If it is determined that the first contrast level $C_1$ is greater than the second contrast level $C_2$, the controller can be instructed (i.e., configured) to execute a decode operation 412 on the first image 500. Otherwise, if it is determined that the second contrast level $C_2$ is greater than the first contrast level $C_1$, the controller can be instructed to execute a decode operation 414 on the second image 600. In the unlikely event that the first contrast level $C_1$ is equal to the second contrast level $C_2$, the controller can be programmed (i.e., configured) to execute a decode operation one of the two images captured either by random selection, on one of the images being considered a default image, or on further analysis of the images.

Ideally, the steps recited above will result in the appropriate image being selected for the barcode decode operation, resulting in the controller successfully performing a barcode decode analysis on only one of the two images. Among other benefits, this may shorten overall barcode read times and reduce necessary computing resources. However, there may be instances when the image with a greater contrast level does not capture a readable barcode. Accordingly, the method 400 may be supplemented with additional steps that help the reader capture the appropriate image for a successful barcode decode.

For example, in the embodiment shown in FIG. 4A, upon determining that the initial decode operation executed in step 412/414 is unsuccessful, the controller may be programmed to return to step 402 to capture a new set of images and perform the relevant analysis on the new set of images. In another embodiment shown in FIG. 4B, upon determining that the initial decode operation executed in step 412/414 is unsuccessful, the controller may be programmed to execute a decode operation on the other of the images that has not yet been used for the decode operation. Thus, if the controller executed an unsuccessful decode operation 412 on the first image, it may further be instructed to execute a decode operation 416 on the second image 600. Conversely, if the controller executed an unsuccessful decode operation 414 on the second image, it may further be instructed to execute a decode operation 418 on the first image 500. From there, if the decode operation was successful, the rear routine terminates. Otherwise, the controller may be programmed to return to step 402 to capture a new set of images and perform the relevant analysis on the new set of images. Additionally, in some embodiments, the controller may be programmed to keep count of consecutive unsuccessful decodes that are based on an image taken by the same imager and manually attempt a decode operation on the image captured by the other of the imagers if the number of unsuccessful decodes exceeds a predetermined threshold. For example, if the reader attempts to unsuccessfully decode a barcode from the image captured by the first imager and this occurs X number of times in a row (with X being the threshold number), as dictated by the calculated contrast levels, on the X+1 attempt to execute a read operation, the controller can be programmed to execute a decode operation on the image captured by the second imager regardless of the calculated contrast levels.

It should be noted that in some embodiments, individual regions selected for contrast analysis, as described above, may be the result of additional contrast level analysis first initiated on a larger initial region. For example, referring back to the image of FIG. 5A, an initial region of 600 pixels centered about the point 504 may be analyzed with that region being broken down into, for example, three sub-regions of equal pixel count of 200. The contrast levels of each of those regions can further be evaluated against one another with the sub-region having the highest contrast level among the three being selected as the overall region whose contrast will be compared against a region of another image. It should be understood that this approach can equally apply to all images being evaluated.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A barcode reader comprising:
    a first imaging assembly configured to capture a first image over a first field of view (FOV);
    a second imaging assembly positioned relative to the first imaging assembly and configured to capture a second image over a second FOV; and
    a controller communicatively coupled to the first imaging assembly and the second imaging assembly, the controller configured to:
        calculate a first contrast level within a first region, the first region being within the first image;
        calculate a second contrast level within a second region, the second region being within the second image;
        execute a first barcode-decode operation on the first image when the first contrast level is greater than the second contrast level; and
        execute the first barcode-decode operation on the second image when the second contrast level is greater than the first contrast level.

2. The barcode reader of claim 1, wherein the controller is further configured to:
    execute a second barcode-decode operation on the second image when the first contrast level is greater than the second contrast level and the first barcode-decode operation is unsuccessful; and
    execute the second barcode-decode operation on the first image when the second contrast level is greater than the first contrast level and the first barcode-decode operation is unsuccessful.

3. The barcode reader of claim 1, wherein the first imaging assembly includes a first linear imager, and wherein the second imaging assembly includes a second linear imager.

4. The barcode reader of claim 1,
    wherein the controller is configured to calculate the first contrast level within the first region by determining a first white level and a first black level, and associating the first contrast level with a difference between the first white level and the first black level, and
    wherein the controller is configured to calculate the second contrast level within the second region by determining a second white level and a second black level, and associating the second contrast level with a difference between the second white level and the second black level.

5. The barcode reader of claim 4,
    wherein the first white level is associated with a first lowest brightness value of a subset of brightest pixels of the first region,
    wherein the first black level is associated with a first highest brightness value of a subset of darkest pixels of the first region,
    wherein the second white level is associated with a second lowest brightness value of a subset of brightest pixels of the second region, and
    wherein the second black level is associated with a second highest brightness value of a subset of darkest pixels of the second region.

6. The barcode reader of claim 5, wherein the subset of brightest pixels of the first region is comprised of a first predetermined percentage of total pixels within the first region, and
    wherein the subset of darkest pixels of the first region is comprised of a second predetermined percentage of the total pixels within the first region.

7. The barcode reader of claim 6, wherein the subset of brightest pixels of the second region is comprised of a third predetermined percentage of total pixels within the second region, and
    wherein the subset of darkest pixels of the second region is comprised of a fourth predetermined percentage of the total pixels within the second region.

8. The barcode reader of claim 4, wherein the controller is configured to determine the first white level and the first black level from a first histogram of the first region, and
wherein the controller is configured to determine the second white level and the second black level from a second histogram of the second region.

9. An imaging engine for use in a barcode reader, comprising:
a first imaging assembly configured to capture a first image over a first field of view (FOV);
a second imaging assembly positioned relative to the first imaging assembly and configured to capture a second image over a second FOV; and
a controller communicatively coupled to the first imaging assembly and the second imaging assembly, the controller configured to:
calculate a first contrast level within a first region, the first region being within the first image;
calculate a second contrast level within a second region, the second region being within the second image;
execute a first barcode-decode operation on the first image when the first contrast level is greater than the second contrast level; and
execute the first barcode-decode operation on the second image when the second contrast level is greater than the first contrast level.

10. The imaging engine of claim 9,
wherein the controller is configured to calculate the first contrast level within the first region by determining a first white level and a first black level, and associating the first contrast level with a difference between the first white level and the first black level, and
wherein the controller is configured to calculate the second contrast level within the second region by determining a second white level and a second black level, and associating the second contrast level with a difference between the second white level and the second black level.

11. The imaging engine of claim 10,
wherein the first white level is associated with a first lowest brightness value of a subset of brightest pixels of the first region,
wherein the first black level is associated with a first highest brightness value of a subset of darkest pixels of the first region,
wherein the second white level is associated with a second lowest brightness value of a subset of brightest pixels of the second region, and
wherein the second black level is associated with a second highest brightness value of a subset of darkest pixels of the second region.

12. The imaging engine of claim 11,
wherein the subset of brightest pixels of the first region is comprised of a first predetermined percentage of total pixels within the first region,
wherein the subset of darkest pixels of the first region is comprised of a second predetermined percentage of the total pixels within the first region,
wherein the subset of brightest pixels of the second region is comprised of a third predetermined percentage of total pixels within the second region, and
wherein the subset of darkest pixels of the second region is comprised of a fourth predetermined percentage of the total pixels within the second region.

13. The imaging engine of claim 10,
wherein the controller is configured to determine the first white level and the first black level from a first histogram of the first region, and
wherein the controller is configured to determine the second white level and the second black level from a second histogram of the second region.

14. A method of decoding a barcode with a barcode reader having a controller communicatively coupled to a first imaging assembly and a second imaging assembly, the method comprising:
capturing a first image via the first imaging assembly over a first field of view (FOV);
capturing a second image via the second imaging assembly over a second FOV;
calculating, via the controller, a first contrast level within a first region, the first region being within the first image;
calculate, via the controller, a second contrast level within a second region, the second region being within the second image;
executing a first barcode-decode operation on the first image when the first contrast level is greater than the second contrast level; and
executing the first barcode-decode operation on the second image when the second contrast level is greater than the first contrast level.

15. The method of claim 14, wherein the operation of capturing the first image and the operation of capturing the second image are performed simultaneously.

16. The method of claim 14,
wherein the operation of calculating the first contrast level within the first region includes determining a first white level and a first black level, and associating the first contrast level with a difference between the first white level and the first black level, and
wherein the operation of calculating the second contrast level within the second region includes determining a second white level and a second black level, and associating the second contrast level with a difference between the second white level and the second black level.

17. The method of claim 16,
wherein the first white level is associated with a first lowest brightness value of a subset of brightest pixels of the first region,
wherein the first black level is associated with a first highest brightness value of a subset of darkest pixels of the first region,
wherein the second white level is associated with a second lowest brightness value of a subset of brightest pixels of the second region, and
wherein the second black level is associated with a second highest brightness value of a subset of darkest pixels of the second region.

18. The method of claim 17,
wherein the subset of brightest pixels of the first region is comprised of a first predetermined percentage of total pixels within the first region,
wherein the subset of darkest pixels of the first region is comprised of a second predetermined percentage of the total pixels within the first region,
wherein the subset of brightest pixels of the second region is comprised of a third predetermined percentage of total pixels within the second region, and
wherein the subset of darkest pixels of the second region is comprised of a fourth predetermined percentage of the total pixels within the second region.

19. The method of claim 16, further comprising:
determining a first histogram of the first region; and
determining a second histogram of the second region,
  wherein the operation of determining the first white level and the first black level is based on the first histogram, and
  wherein the operation of determining the second white level and the second black level is based on the second histogram.

20. The method of claim 14, wherein the first imaging assembly includes one of a linear imager or a two-dimensional imager.

* * * * *